(12) United States Patent
Reuschel

(10) Patent No.: US 6,626,031 B2
(45) Date of Patent: Sep. 30, 2003

(54) METHOD OF DETECTING OSCILLATIONS

(75) Inventor: Michael Reuschel, Ottersweier (DE)

(73) Assignee: LuK Lamellen und Kupplungsbau Beteiligungs KG, Buhl (DE)

( * ) Notice: Subject to any disclaimer, the term of this patent is extended or adjusted under 35 U.S.C. 154(b) by 115 days.

(21) Appl. No.: 09/725,440

(22) Filed: Nov. 29, 2000

(65) Prior Publication Data

US 2001/0002549 A1 Jun. 7, 2001

(30) Foreign Application Priority Data

Dec. 2, 1999 (DE) .......................... 199 58 139

(51) Int. Cl.[7] .............................................. G01M 15/00
(52) U.S. Cl. ...................................... 73/118.1; 73/118.1
(58) Field of Search ....................... 73/35, 116, 118.1, 73/118.2; 123/436, 486; 701/51

(56) References Cited

U.S. PATENT DOCUMENTS 5,747,678 A * 5/1998 Angermaier ............... 73/116
6,286,473 B1 * 9/2001 Zaremba ................. 123/192.1

* cited by examiner

*Primary Examiner*—Kamand Cuneo
*Assistant Examiner*—Monica D. Harrison
(74) *Attorney, Agent, or Firm*—Darby & Darby

(57) ABSTRACT

Oscillations of a variable quantity, particularly of the rpm rate of an input shaft of a cone-pulley transmission in the power train of a vehicle, are detected by monitoring the rate of change of the variable quantity during time intervals of a predetermined length. The difference between the maximum and minimum levels that the rate of change reaches during the predetermined time period is compared to a threshold reference, and if it is found to exceed the threshold reference, the variable quantity is judged to be in a state of oscillation.

6 Claims, 2 Drawing Sheets

METHOD OF DETECTING OSCILLATIONS

BACKGROUND OF THE INVENTION

The invention relates to a method of detecting oscillatory variations in the magnitude of a quantity such as, in particular, oscillatory variations in the rate of rotation (rpm rate) of an input shaft of a cone-pulley transmission in the power train of a vehicle.

FIG. 2 presents a schematic view of a power train of a vehicle that is equipped with a cone-pulley transmission.

An internal combustion engine 2 is connected by way of a clutch 4 to the input shaft 6 of a cone-pulley transmission 8. The output shaft 10 of the transmission 8 is connected by way of a differential 12 to the driven wheels 14 of a motor vehicle. The cone-pulley transmission 8 has two pairs of conical discs and a flexible torque-transmitting device 16, e.g., a chain or belt, running in an endless loop around the pairs of conical discs. The transmission ratio can be changed by increasing the distance between the conical discs of one pair while simultaneously decreasing the distance between the conical discs of the other pair.

The power train is controlled by a control unit 18, which receives signals through inputs 20 from a drive pedal 22 and from sensors (not shown in the drawing) that register, e.g., the rpm rate of the internal combustion engine, the dynamic torque load on the combustion engine, the rpm rate of the transmission input shaft 6, the rpm rate of the transmission output shaft 10, etc. The outputs of the control unit 18 are connected to an actuator member 24 for setting the engine load, to the clutch 4, and to actuators for setting the ratio of the cone-pulley transmission 8.

The structure and function of the individual modules of the power train of FIG. 2 as well as the ways in which they interact with each other are known per se and will therefore not be further explained.

Torsional vibrations are frequently a problem in vehicle power trains, e.g., oscillations of the rpm rate of the input shaft 6 of the cone-pulley transmission 8, which can be caused by a variety of dynamic factors. These oscillations in the rpm rate, which can be detrimental to the comfort of the occupants of the vehicle, often occur in a range between 0.5 and 5 Hz. To detect such rpm-rate oscillations reliably poses a problem, because it is frequently impossible to ascertain whether a change in the rpm rate is caused by a change of the torque load, a controlled and/or regulated change of the transmission ratio, a change in the amount of slippage occurring in the clutch, and so forth. If oscillations in the rpm rate are identified as unintended oscillatory variations, it is possible to activate oscillation-damping algorithms that are stored in the control unit 18.

OBJECT OF THE INVENTION

It is therefore the object of the present invention to provide a method by which rpm-rate oscillations of the kind described above can be reliably detected.

SUMMARY OF THE INVENTION

To meet the foregoing objective, the invention provides a method of detecting oscillations of a variable quantity. In particular, the method serves to detect the rpm rate of the input shaft of a cone-pulley transmission in the power train of a vehicle. According to the inventive method, a time derivative (i.e., a rate of change, herein also referred to as a time gradient) of the variable quantity that is prone to oscillations, or at least a value that is related to that time gradient, is registered over the course of a predetermined time period. The difference between the maximum and minimum levels that the registered value reaches during the predetermined time period is compared to a threshold reference. If the difference between the maximum and minimum exceeds the threshold reference, the variable quantity is judged to be in a state of oscillation. Surprisingly, this proves to be a reliable way of detecting the presence of an oscillation, which can then be counteracted through an appropriate use of control algorithms.

In a particular embodiment of the inventive method, the value that is being registered is the difference between the time gradient of the variable quantity and a reference gradient.

Any embodiment of the inventive method may also include a feature whereby the method is not carried out when certain predetermined conditions are present that have an influence on a change of the variable quantity.

In a particular embodiment of the invention, the variable quantity that is prone to oscillations is the rpm rate of the input shaft of a cone-pulley transmission of a vehicle, and the quantity that is being registered is the time gradient of the rpm rate of the input shaft.

In a variation of the preceding embodiment, the variable quantity that is prone to oscillations is again the rpm rate of the input shaft of a cone-pulley transmission of a vehicle, while the quantity that is being registered is the time gradient of the engine rpm rate, the transmission ratio, the output rpm rate of the cone-pulley transmission, or the vehicle speed.

As mentioned above, the inventive method may include a feature whereby the method is not carried out when certain predetermined conditions are present. In particular, such predetermined conditions include one or more of the following:

a) a control target set for the time gradient of the transmission input rpm rate exceeds a predetermined threshold level;

b) the time gradient of the engine-torque exceeds a predetermined threshold level;

c) the time gradient (rate of change) of the amount of drive-pedal depression exceeds a predetermined threshold level.

The inventive method is suitable for detecting oscillations in substantially all kinds of quantities that are capable of oscillatory variation, including mechanical oscillations, linear or rotatory oscillations, oscillations of electrical parameters, etc., to name only a few. The invention is particularly well suited for detecting oscillations of the rpm rate in the power train of a motor vehicle, especially the input rpm rate of a cone-pulley transmission that is part of the power train.

The novel features that are considered as characteristic of the invention are set forth in particular in the appended claims. The improved apparatus itself, however, both as to its construction and its mode of operation, together with additional features and advantages thereof, will be best understood upon perusal of the following detailed description of certain presently preferred specific embodiments with reference to the accompanying drawing.

DESCRIPTION OF PREFERRED EMBODIMENTS

Figure 1:
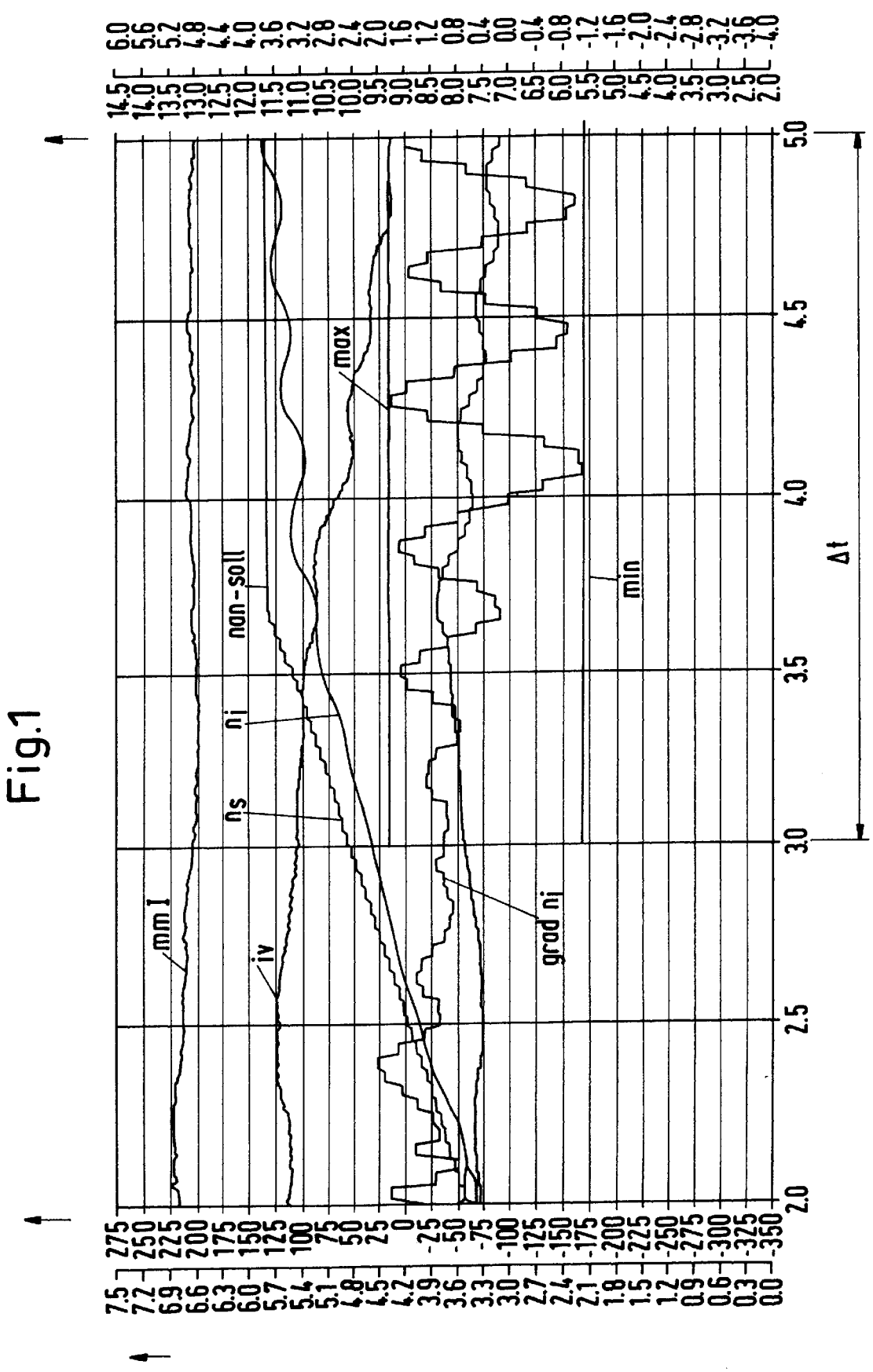
FIG. 1 represents measurement graphs referred to in the description of an embodiment of the invention.
Figure 2:
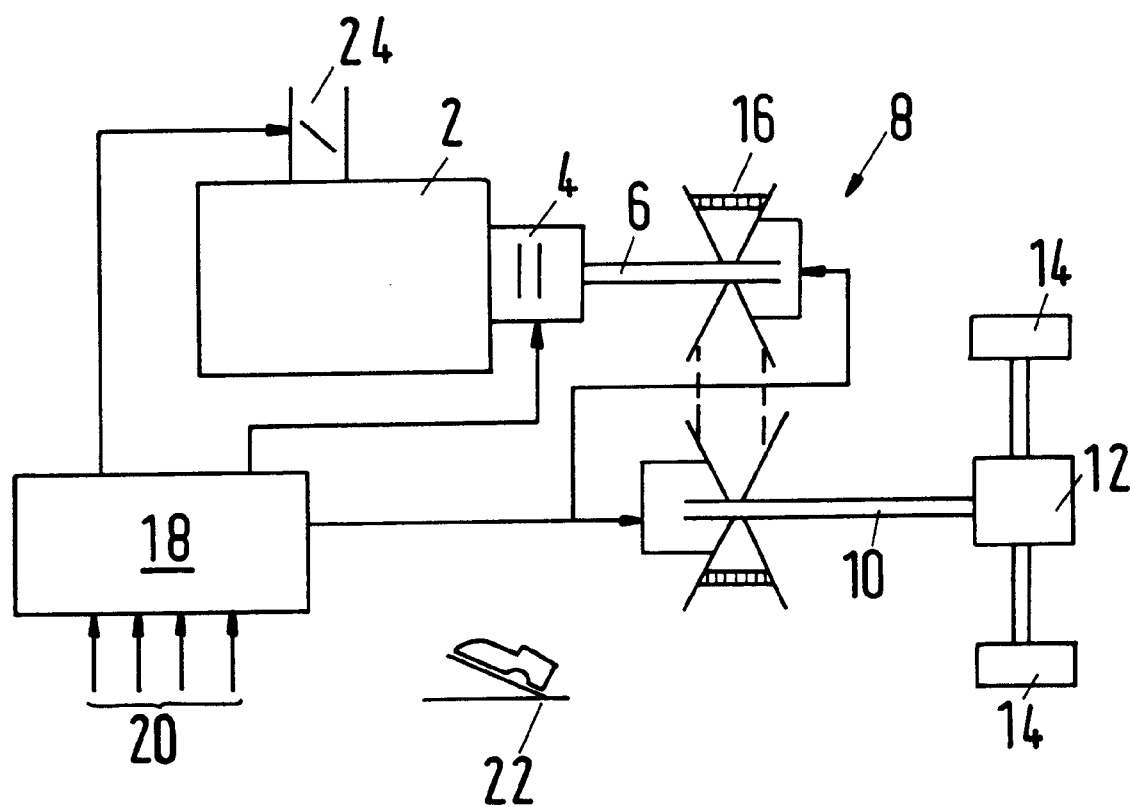
FIG. 2 illustrates the power train of a motor vehicle as described above under "Background of the Invention".

In FIG. 1, the leftmost ordinate axis of the graph is graduated in units of $10^3$ rpm from zero to $7.5 \times 10^3$ rpm. The next axis from the left indicates engine torque in Newton-meter units from −350 to 275 Nm. To the right of the graph, the first ordinate axis indicates the time gradient of the rpm rate in units of $10^3$ rpm/sec, and the rightmost axis indicates the gradient of $n_i$. The abscissa indicates time in seconds.

The curve labeled $n_s$ represents an example of a target profile for the rpm rate $n_s$ of the input shaft of the cone-pulley transmission during a start-up phase of the vehicle. The curve labeled $n_i$ represents the time profile of the actually occurring rpm rate $n_1$ of the input shaft. The curve $n_i$ clearly shows an oscillatory component in the rpm rate $n_i$. The curve labeled grad $n_i$ represents the time gradient of the actually occurring rpm rate $n_1$ of the input shaft.

According to the invention, the extremes MAX and MIN are determined, which are reached by the curve grad $n_i$ during a given time interval. In the example of FIG. 1, the time interval is 2 seconds, as indicated graphically by the interval Δt extending between the time values 3.0 and 5.0 on the abscissa. If the difference between MAX and MIN exceeds a predetermined value, this represents a reliable symptom for the presence of an oscillation. In the illustrated example, the criterion for the presence of an oscillation is set at a threshold value of 1500 rpm per second for the difference between MAX and MIN.

As can be seen immediately in FIG. 1, even a slight amount of rotary oscillation is marked by a time-gradient curve with MAX-MIN differences of considerable amplitude. Thus, the presence of oscillations can be established reliably by monitoring the time derivative of the rpm rate and its MAX and MIN values within a time window that is longer than the expected oscillation period.

The method described on the basis of FIG. 1 can be modified in many different ways. For example, instead of monitoring the rpm rate of the transmission input shaft, one could monitor other quantities such as the engine rpm rate (in the engaged state of the clutch), the transmission ratio, the rpm rate of the transmission output shaft, or also (with some restrictions) the speed (wheel rpm rate) of the vehicle. The time derivative (also called time gradient, rpm gradient, or gradient, for short) of any of these quantities can be calculated and used to detect the presence of oscillations in the same manner as has been explained for the example of FIG. 1.

Instead of evaluating the difference between the maximum and minimum values of the rpm gradient, it is also possible to perform what could be called a relative evaluation, by calculating the gap between the actual rpm gradient and the target gradient at successive points in time and using the difference between maximum and minimum gap values during a given time window as a criterion for the presence of an oscillation.

In order to limit the detection of rpm oscillations to those that originate in the transmission itself and to eliminate driver-related factors (e.g., oscillatory jolts when reversing the load on the engine from deceleration to acceleration or vice versa) or road-related factors (e.g., a sudden loss of wheel traction), the oscillation-detecting process is cancelled when certain predetermined conditions are present. Examples of such predetermined conditions are:

a target gradient set for the transmission input rpm rate exceeds a predetermined threshold gradient of the transmission input rpm rate (e.g., in the case of a Tiptronic transmission);

the engine-torque gradient exceeds a predetermined threshold gradient of the engine torque (e.g., when reversing the load on the engine); or the gradient (rate of change) of the drive-pedal position exceeds a predetermined threshold gradient of the drive-pedal position (e.g., when reversing the load on the engine).

At a time when one or more of the aforementioned conditions are no longer present, the oscillation-detecting process is reactivated with a certain delay of, e.g., 300 to 1000 milliseconds.

The oscillation-detecting process can be carried out in such a manner that the individual time windows Δt of FIG. 1 follow each other successively. An alternative possibility is to let the time windows follow each other with a mutual overlap, whereby the sensitivity of detection is improved.

By using the oscillation-detecting method according to the present invention, it is possible to effect controlled variations in the servo parameters of the transmission so that oscillations are recognized at the moment when they are about to occur or are entirely prevented from occurring, whereby the level of driving comfort is increased.

The method according to the invention is performed advantageously by using hardware and software incorporated in the control unit 18 in a manner that is known per se, with appropriate memory devices being controlled by a microprocessor that is contained in the control unit 18.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the aforedescribed contribution to the art and, therefore, such adaptations should and are intended to be comprehended within the meaning and range of equivalence of the appended claims.

What is claimed is:

1. A method of detecting oscillations substantially in a range from 0.5 Hz to 5 Hz in an rpm rate of an input shaft of a cone-pulley transmission in a power train of a vehicle, the method comprising the steps of a) monitoring the rpm rate of the input shaft as a function of time;

b) determining during a predetermined time interval a value that is related to a time gradient of the rpm rate;

c) establishing a maximum and a minimum reached by the value of step b) during the predetermined time interval;

d) calculating a difference between the maximum and the minimum; and e) concluding that the function of time in step a) comprises an oscillation, if said difference in step d) is greater than a predetermined threshold reference.

2. The method of claim 1, wherein the value determined in step b) is the time gradient itself.

3. The method of claim 1, wherein the value determined in step b) is a difference between the time gradient itself and a reference gradient of the rpm rate.

4. The method of claim 1, comprising the additional steps a'), a''), and a''') to be performed prior to step a):

a') monitoring for the presence of predetermined conditions that originate outside the transmission and are prone to cause oscillations in the range from 0.5 Hz to 5 Hz in the rpm rate of the input shaft of the cone-pulley transmission a") if said predetermined conditions are found to be absent, continuing with steps a) through e) of the method; and a''') if said predetermined conditions are found to be present, returning to step a').

5. The method of claim 1, wherein the value determined in step b) is a time gradient of one of the group of variables consisting of engine rpm rate, transmission ratio, output rpm rate of the cone-pulley transmission, and vehicle speed.

6. The method of claim 4, wherein the predetermined conditions include at least one of the conditions where a) a target gradient set for the transmission input rpm rate exceeds a predetermined threshold gradient of the transmission input rpm rate;

b) an engine-torque gradient exceeds a predetermined threshold gradient of the engine torque;

c) a gradient of a drive-pedal position exceeds a predetermined threshold gradient of the drive-pedal position.

* * * * *